United States Patent
Geng et al.

(10) Patent No.: US 10,341,269 B2
(45) Date of Patent: Jul. 2, 2019

(54) THREADED CONVERSATION CHANNEL WITH A TEMPORARILY EXCLUSIVE CONVERSATION

(71) Applicant: Microsoft Technology Licensing, LLC, Redmond, WA (US)

(72) Inventors: Yingying Geng, Seattle, WA (US); Chad A. Voss, Seattle, WA (US); Vivian Hsu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 15/357,820

(22) Filed: Nov. 21, 2016

(65) Prior Publication Data

US 2018/0145936 A1 May 24, 2018

(51) Int. Cl.
- *G06F 15/16* (2006.01)
- *H04L 12/58* (2006.01)
- *G06Q 10/10* (2012.01)

(52) U.S. Cl.
CPC .......... *H04L 51/04* (2013.01); *G06Q 10/107* (2013.01); *H04L 51/12* (2013.01); *H04L 51/16* (2013.01);
(Continued)

(58) Field of Classification Search
CPC .................. H04L 51/00–36; G06Q 10/107
See application file for complete search history.

(56) References Cited

U.S. PATENT DOCUMENTS

| | | |
|---|---|---|
| 8,910,055 B2 | 12/2014 | Berger |
| 2006/0019638 A1 | 1/2006 | Chiu et al. |

(Continued)

FOREIGN PATENT DOCUMENTS

WO 2016033377 A1 3/2016

OTHER PUBLICATIONS

"International Search Report and Written Opinion Issued in PCT Application No. PCT/US2017/061420", dated Jan. 3, 2018, 11 Pages.
(Continued)

*Primary Examiner* — Brendan Y Higa
(74) *Attorney, Agent, or Firm* — Michael Best & Friedrich LLP

(57) ABSTRACT

Threaded conversation channel with a temporarily exclusive conversation. One embodiment includes a data processing system implementing a threaded conversation channel. The data processing system includes a network interface coupled to a network. The data processing system also includes a memory for storing instructions and an electronic processor coupled to the network interface and the memory. The electronic processor is configured to execute the instructions to generate the threaded conversation channel and to receive conversation parameters including a recipient, a delivery time, and initial message content. The electronic processor is also configured to post a temporarily exclusive conversation based on the conversation parameters that is hidden from at least a first user of the temporarily exclusive conversation and viewable by at least a second user. The electronic processor is also configured to reveal, to the first user at the delivery time, the temporarily exclusive conversation on the threaded conversation channel.

20 Claims, 11 Drawing Sheets

(52) U.S. Cl.
CPC .............. *H04L 51/18* (2013.01); *H04L 51/24*
(2013.01); *H04L 51/34* (2013.01)

(56) References Cited

U.S. PATENT DOCUMENTS

| | | |
|---|---|---|
| 2010/0223155 A1 | 9/2010 | Anderson et al. |
| 2010/0235449 A1 | 9/2010 | Eggers et al. |
| 2012/0011450 A1* | 1/2012 | To .......................... G06Q 10/10 715/752 |
| 2013/0036478 A1* | 2/2013 | Davis ..................... G06Q 10/10 726/28 |
| 2013/0097044 A1 | 4/2013 | Cutler |
| 2013/0132228 A1 | 5/2013 | Chang |
| 2013/0151630 A1 | 6/2013 | Lawrence-Apfelbaum |
| 2015/0039710 A1 | 2/2015 | Feghali |
| 2015/0120491 A1 | 4/2015 | Bisht |
| 2015/0154676 A1 | 6/2015 | Matousek et al. |
| 2015/0172246 A1* | 6/2015 | Velummylum ......... H04L 51/18 709/206 |
| 2015/0235291 A1 | 8/2015 | Berger et al. |
| 2015/0372959 A1 | 12/2015 | Velummylum et al. |
| 2016/0149843 A1 | 5/2016 | Spicer et al. |
| 2016/0163079 A1 | 6/2016 | Lee |

OTHER PUBLICATIONS

"How to Schedule an eCard", https://www.punchbowl.com/p/schedule-an-ecard, Published on: Apr. 17, 2013, 4 pages.

* cited by examiner

THREADED CONVERSATION CHANNEL WITH A TEMPORARILY EXCLUSIVE CONVERSATION

FIELD

Embodiments described herein relate to methods and systems for conversing on a threaded conversation channel, and, more particularly, to posting a temporarily exclusive conversation to a threaded conversation channel that is hidden from a recipient until a specified delivery time.

BACKGROUND

Users of a communication application, such as a messaging application or an electronic mail application, converse on a threaded conversation channel by posting threaded conversations (for example, a message, an electronic mail message, such as an email, and the like) to the threaded conversation channel. The threaded conversation channel is displayed to one or more users associated with the threaded conversation channel. Typically, when a user posts a threaded conversation to the threaded conversation channel, the posted threaded conversation is instantaneously displayed on the threaded conversation channel and viewable to all the users associated with the threaded conversation channel. Instantaneously, as used herein, means the amount of time it takes for the data to be processed, conveyed, and displayed, including processing and networking delays (for example, within a few seconds or a minute).

SUMMARY

Users converse on a threaded conversation channel for a variety of reasons. For example, colleagues who work remotely may use a threaded conversation channel to discuss active work projects with each other. Additionally, family and friends who live apart from of each other may use a threaded conversation channel to stay in touch with each other. However, since threaded conversations are instantaneously displayed on a threaded conversation channel to the users associated with that threaded conversation channel, a sender of a threaded conversation may be inconvenienced or unable to appropriately time the posting of a threaded conversation to achieve a desired result. For example, a sender may want to send a happy birthday message to a user via a threaded conversation channel; but, to be timely, the sender must wait to post the happy birthday message until the user's actual birthday. Additionally, a sender cannot use the typical threaded conversation channel to coordinate with other users a message to the recipient in advance of the event, as the recipient will be able to view the threaded conversation.

Thus, embodiments provide, among other things, systems and methods to converse on a threaded conversation channel by posting a temporarily exclusive conversation that is temporarily hidden from a designated recipient(s) of the temporarily exclusive conversation on the threaded conversation channel. As described in more detail below, a sender may send, via the threaded conversation channel, a temporarily exclusive conversation (for example, a greeting card) to a specific person(s) associated with the threaded conversation channel. The temporarily exclusive conversation will not be revealed on the threaded conversation channel to the recipient until a sender-specified delivery time. Prior to revealing the temporarily exclusive conversation to the recipient(s), the temporarily exclusive conversation sent by the sender is posted to the threaded conversation channel, which allows other users associated with the threaded conversation channel to view and reply to the temporarily exclusive conversation. At the specified delivery time, the temporarily exclusive conversation may be revealed to the recipient(s) on the threaded conversation channel. The recipient(s) may open the temporarily exclusive conversation to view additional message content and reply messages, if any, provided by the other users associated with the threaded conversation channel. Therefore, embodiments provide a less restrictive threaded conversation channel enabling temporarily exclusive conversations among users for a variety of uses.

Accordingly, embodiments relate to methods and systems for conversing on a threaded conversation channel. For example, one embodiment provides a data processing system implementing a threaded conversation channel. The data processing system includes a network interface coupled to a network. The data processing system also includes a memory for storing instructions and an electronic processor coupled to the network interface and the memory. The electronic processor is configured to execute the instructions stored in the memory to display the threaded conversation channel, the threaded conversation channel associated with a plurality of users. The electronic processor is also configured to execute the instructions stored in the memory to receive conversation parameters including an at least one recipient, a delivery time, and initial message content. The electronic processor is also configured to execute the instructions stored in the memory to post, to the threaded conversation channel, a temporarily exclusive conversation based on the conversation parameters, wherein the temporarily exclusive conversation is hidden from at least a first user of the plurality of users and viewable by at least a second user of the plurality of users on the threaded conversation channel, the conversation parameters indicating to hide the temporarily exclusive conversation from the first user or make viewable the temporarily exclusive conversation to the second user. The electronic processor is also configured to execute the instructions stored in the memory to reveal, to the first user at the delivery time, the temporarily exclusive conversation on the threaded conversation channel.

In another embodiment, a method of conversing on a threaded conversation channel is provided. The method includes displaying the threaded conversation channel, the threaded conversation channel being associated with a plurality of users. The method also includes receiving conversation parameters including an at least one recipient, a delivery time, and initial message content. The method also includes posting, to the threaded conversation channel with an electronic processor, a temporarily exclusive conversation based on the conversation parameters, wherein the temporarily exclusive conversation is hidden from at least a first user of the plurality of users and viewable by at least a second user of the plurality of users on the threaded conversation channel, the conversation parameters indicating to hide the temporarily exclusive conversation from the first user or make viewable the temporarily exclusive conversation to the second user. The method also includes revealing, to the first user at the delivery time, the temporarily exclusive conversation on the threaded conversation channel.

In another embodiment, a computer readable medium is provided including instructions that, when executed by an electronic processor, cause the electronic processor to execute a set of functions. The set of functions include generating the threaded conversation channel, the threaded conversation channel being associated with a plurality of users. The set of functions further include receiving conversation parameters including an at least one recipient, a delivery time, and initial message content. The set of functions also include posting, to the threaded conversation channel with an electronic processor, a temporarily exclusive conversation based on the conversation parameters, wherein the temporarily exclusive conversation is hidden from at least a first user of the plurality of users and viewable by at least second user of the plurality of users on the threaded conversation channel, the conversation parameters indicating to hide the temporarily exclusive conversation from the first user or make viewable the temporarily exclusive conversation to the second user. The set of functions further include revealing, to the first user at the delivery time, the temporarily exclusive conversation on the threaded conversation channel.

Other aspects of the embodiments will become apparent by consideration of the detailed description and accompanying drawings.

DETAILED DESCRIPTION

Before any embodiments are explained in detail, it is to be understood that they are not limited in their application to the details of construction and the arrangement of components set forth in the following description or illustrated in the accompanying drawings. Embodiments are capable of being practiced, carried out, and/or implemented in various other ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. Additionally, although embodiments herein may include connections or couplings described in the singular, such connections or couplings, in some embodiments, may include multiple connections or couplings. Also, electronic communications and notifications may be performed using any known means including direct connections, indirect connections with intervening components, wireless connections, etc. Embodiments are also disclosed as including various memories, processors, and other computer components, which may be described in the singular, respectively, in some instances. However, in addition to being implemented as a single memory, processor, or other computer component, in some embodiments, such memories, processors, and other computer components may include multiple respective memories, processors, and computer components to carry out the functionality thereof in a distributed manner.

Figure 1:
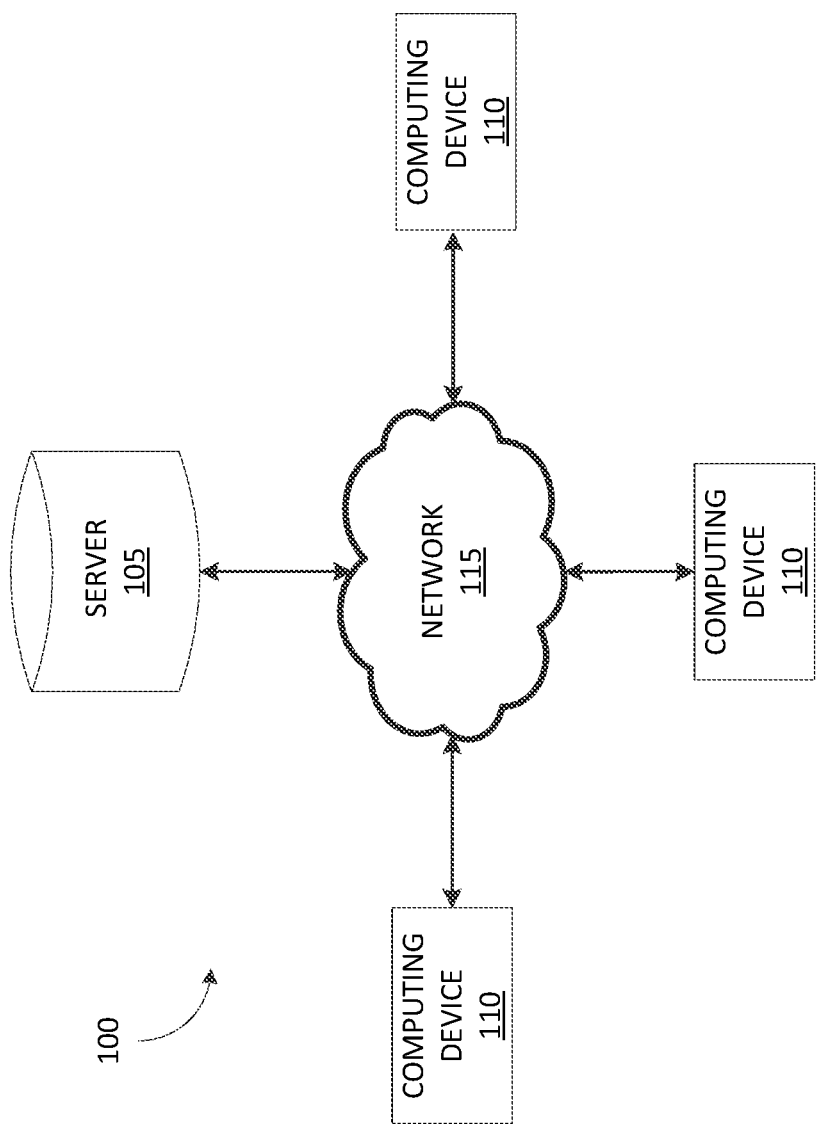
FIG. 1 is a schematic diagram illustrating a system for conversing on a threaded conversation channel that includes a server and a plurality of computing devices.

FIG. 1 illustrates a system 100 for conversing on a threaded conversation channel according to one embodiment. The system 100 includes a server 105 and a plurality of computing devices 110. In some embodiments, the system 100 includes fewer, additional, or different components than illustrated in FIG. 1.

In some embodiments, the server 105 communicates with (for example, transmits data to and receives data from) the plurality of computing devices 110 over a network 115. The network 115 may include one or more of the Internet, a cellular network, a public network, a private network, and other wired or wireless networks. In some embodiments, the network 115 includes a direct channel of communication between the server 105 and the plurality of computing devices 110 (for example, a dedicated wired connection). Furthermore, in some embodiments, the server 105 communicates with the plurality of computing devices 110 indirectly through one or more intermediary computing devices. For example, the server 105 may communicate (for example, through a wired or wireless connection or network) with an intermediary computing device, and the intermediary computing device may communicate with one or more of the plurality of computing devices 110 (for example, through the network 115). Also, in some embodiments, the server 105 is included in one or more of the plurality of computing devices 110.

Figure 2:
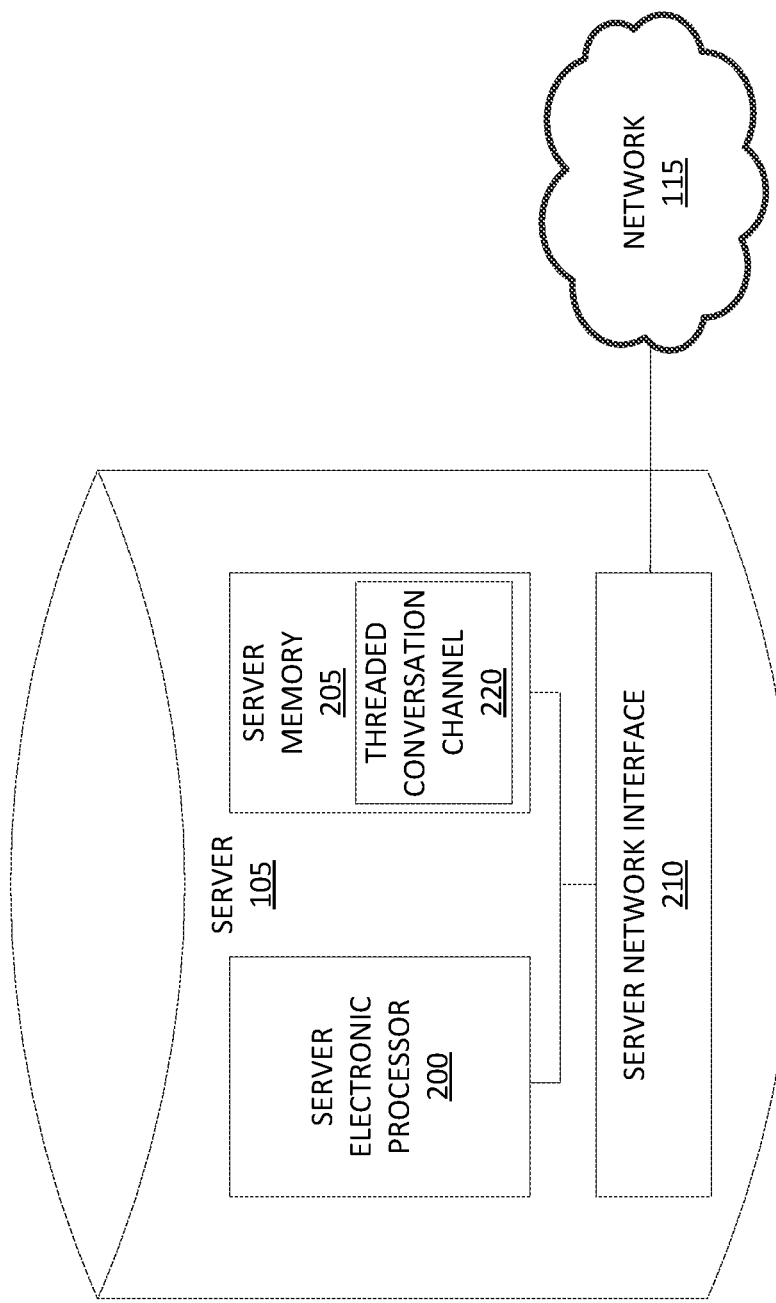
FIG. 2 is a block diagram illustrating the server of FIG. 1.

FIG. 2 schematically illustrates the server 105 according to one embodiment. As illustrated in FIG. 2, the server 105 includes an electronic processor (herein server electronic processor 200) (for example, a microprocessor or other programmable device), a memory (herein server memory 205) (for example, a non-transitory computer-readable medium), and a network interface (herein server network interface 210). It should be understood that the server 105 may include fewer or additional components than as illustrated in FIG. 2 and may include components in configurations different than the configuration illustrated in FIG. 2. Also, the server 105 may be configured to perform additional functionality than the functionality described below. In addition, the functionality performed by the server 105 as described below may be distributed among multiple servers or devices collectively referred to as the server. The multiple servers or devices may form a cloud-based implementation to perform the functionality described herein via cloud computing.

The server electronic processor 200 is configured to retrieve instructions and data from the server memory 205 (for example, read-only memory, random-access memory, or combinations thereof) and execute, among other things, the instructions. The server electronic processor 200 is configured to execute instructions to perform a set of functions including the methods described herein. As illustrated in FIG. 2, in some embodiments, the server memory 205 includes a threaded conversation channel 220. As described in more detail below, the threaded conversation channel 220 may include, among other things, a team of users associated with the threaded conversation channel 220, a threaded conversation channel name, and a conversation stream that includes a collection of threaded conversations. In some embodiments, the threaded conversation channel 220 is stored on one or more of the plurality of computing devices 110 (for example, stored in a memory of one or more of the plurality of computing devices 110).

The server network interface 210 transmits data from the server 105 to external systems, networks, and/or devices and receives data from external systems, networks, and/or devices. The server network interface 210 may also store data received from external sources to the server memory 205 and/or provide received data to the server electronic processor 200. As illustrated in FIG. 2, in some embodiments, the server network interface 210 communicates with the network 115 (for example, for communicating with one or more of the plurality of computing devices 110, an intermediary computing device, or a combination thereof).

The plurality of computing devices 110 may include, for example, a desktop computer, a laptop computer, a tablet computer, a communication device (such as a smart telephone or smart wearable), and the like. Each of the plurality of computing devices 110 may be associated with one or more users. For example, a first computing device of the plurality of computing devices 110 may be associated with a first user while a second computing device of the plurality of computing devices 110 may be associated with a second user. Each of the plurality of computing devices 110 may be used by a user to, among other things, converse on a threaded conversation channel. In some embodiments, a user may be associated with more than one of the computing devices 110 (for example, a communication device, a tablet computer, and a laptop computer). When a user is associated with more than one computing device 110, the threaded conversation channel 220 may be kept consistent and synchronized across the more than one computing devices 110 associated with the user. For example, the threaded conversation channel 220 may be displayed consistently and in synchronization on both a laptop computer of a user and a tablet computer of the user.

Figure 3:
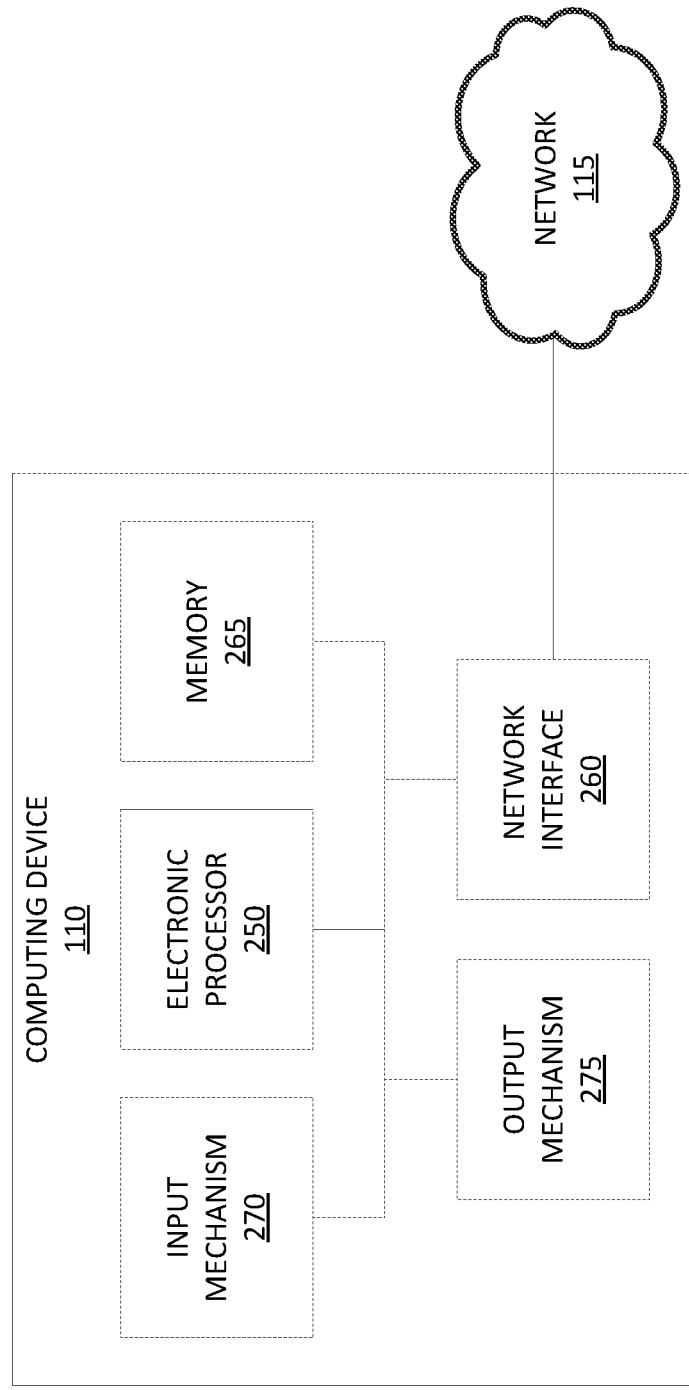
FIG. 3 is a block diagram illustrating one of the plurality of computing devices of FIG. 1.

FIG. 3 schematically illustrates one of the plurality of computing devices 110 (hereinafter referred to as "the computing device 110") as a representative example of each of the plurality of computing devices 110 according to one embodiment. As illustrated in FIG. 3, the computing device 110 includes an electronic processor 250 (for example, a microprocessor or other programmable device), a network interface 260, a memory 265 (for example, a non-transitory computer-readable medium), one or more input mechanisms 270, and one or more output mechanisms 275 communicating over one or more wired or wireless connections or buses. It should be understood that the computing device 110 may include fewer or additional components than as illustrated in FIG. 3 and may include components in configurations other than the configuration illustrated in FIG. 3. Also, the computing device 110 may be configured to perform additional functionality than the functionality described herein.

The electronic processor 250 is configured to retrieve instructions and data from the memory 255 (for example, read-only memory, random-access memory, or combinations thereof) and execute, among other things, the instructions. The input mechanism 270 may include a keypad, a button, a keyboard, a mouse, a touchscreen, a trackball, a joystick, a camera, microphone, and the like for receiving input from a user of the computing device 110. For example, the input mechanisms may be a keyboard and a mouse used by the user of the computing device 110 to, among other things, converse on a threaded conversation channel. Similarly, the output mechanism 275 may include a display device, a speaker, a printer, and the like for providing output to a user of the computing device 110. For example, the output mechanism 275 may be a display device used to display, among other things, a threaded conversation channel to the user of the computing device 110. In some embodiments, a single device, such as a touch screen display, includes both the input mechanism 270 and the output mechanism 275, or a portion thereof.

The network interface 260 transmits data from the computing device 110 to external systems, networks, and/or devices and receives data from external systems, networks, and/or devices. The network interface 260 may also store data received from external sources to the memory 265 and/or provide received data to the electronic processor 250. As illustrated in FIG. 3, in some embodiments, the network interface 260 communicates with the network 115 (for example, for communicating with the server 105). Alternatively, or in addition, the network interface 260 may include a connector or port for receiving a wired connection to the server 105 or an intermediate computing device as described above (for example, a USB cable). Furthermore, in some embodiments, the network interface 260 communicates with a network interface or a communication port or bus of another computing device (for example, a second computing device, a third computing device, and the like).

Figure 4:
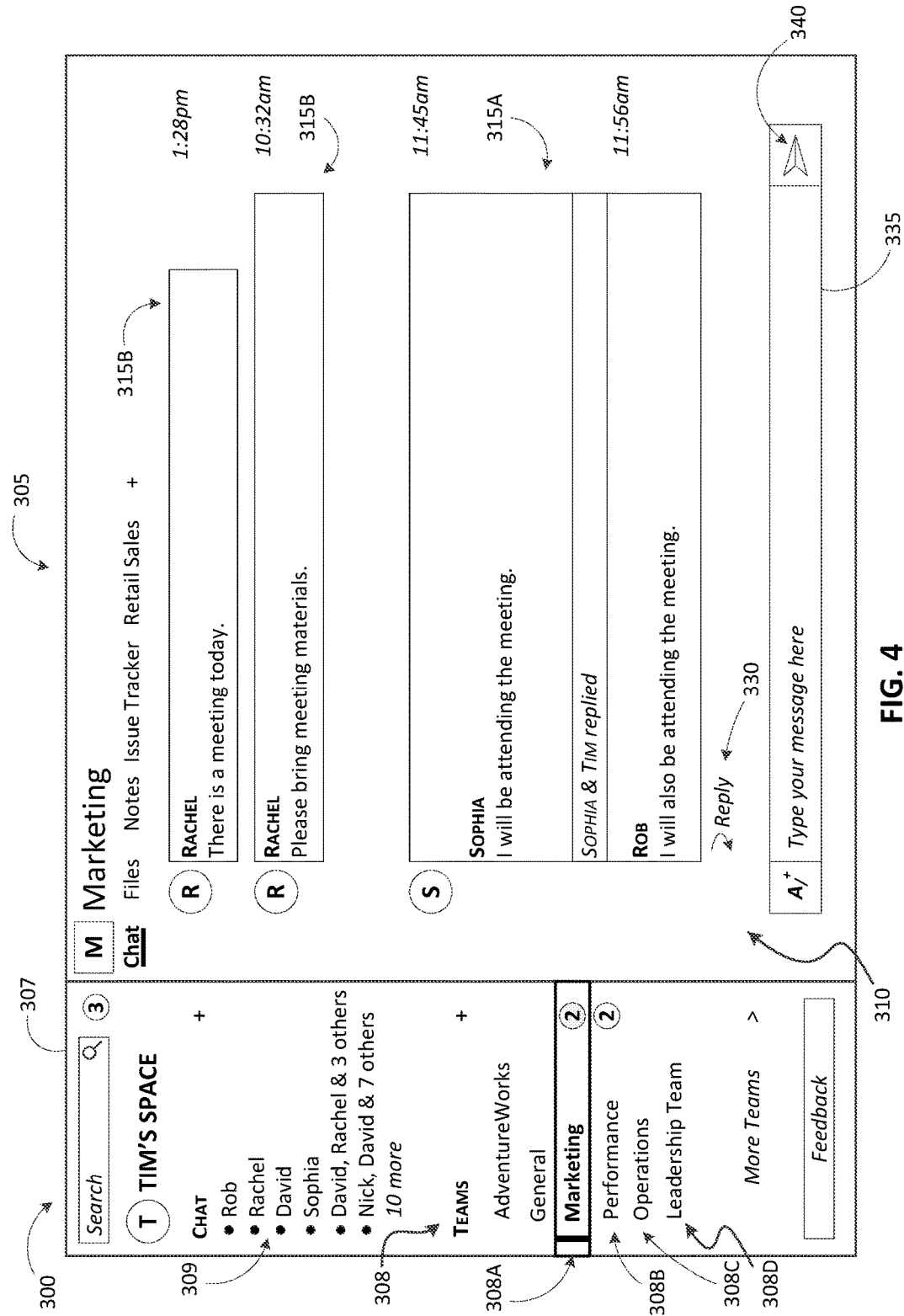
FIG. 4 is a screenshot illustrating the threaded conversation channel of FIG. 1.

FIG. 4 illustrates a graphical user interface 300 of a communication application used for conversing on a threaded conversation channel, for example, the threaded conversation channel 220 of FIG. 2, according to one embodiment. As illustrated in FIG. 4, the graphical user interface 300 includes a threaded conversation channel 305, which is, for example, a graphical representation of the threaded conversation channel 220 and the contents thereof. In some embodiments, the graphical user interface 300 includes an activity rail 307. The activity rail 307 includes, among other things, a channel navigation panel 308. The channel navigation panel 308 may allow a user to navigate between one or more available channels with which the user is associated. For example, the channel navigation panel 308 may include a listing of the channels available to a user of the computing device 110. As illustrated in FIG. 4, the user may be associated with a variety of channels, for example, a marketing channel 308A, a performance channel 308B, an operations channel 308C, and a leadership team channel 308D. Each channel may be associated with one or more users included in a team or group of users. For example, the marketing channel 308A may include one or more users included in a marketing team and the operations channel 308C may include one or more different users included in an operations team. The activity rail 307 may further include a team list 309 listing users of a team associated with a selected channel of the channel navigation panel 308 (for example, the marketing channel 308A). In some embodiments, a channel is created or used for a meeting, which may be a one-time meeting or a re-occurring meeting. The team of users for this channel includes the users participating in the meeting. In some embodiments, a channel is created or used for a chat. The team of users for this channel includes the users participating in the chat.

Additionally, each channel may be associated with a threaded conversation channel 305. For example, as illustrated in FIG. 4, the threaded conversation channel 305 is associated with the marketing channel 308A. The threaded conversation channel 305 includes a conversation stream 310. The conversation stream 310 includes a collection of threaded conversations. The conversation stream 310 may include one or more single-message threaded conversations 315B and one or more multi-message threaded conversations 315A. The single-message threaded conversations 315B are threaded conversations consisting of a single message. A single-message threaded conversation 315B may become a multi-message threaded conversation 315A when a new single-message threaded conversation is posted to the threaded conversation channel 305 in reply to a previously posted single-message threaded conversation. When a new single-message threaded conversation is posted in reply to a previously posted single-message threaded conversation, the new single-message threaded conversation is linked to the previously posted single-message threaded conversation. Accordingly, the multi-message threaded conversations 315A are threaded conversations consisting of two or more linked single-message threaded conversations 315B.

In some embodiments, a user replies to a previously posted threaded conversation, or message within a threaded conversation, by using a reply button 330 associated with the previously posted threaded conversation. Alternatively, or in addition to, a new threaded conversation may be posted to the threaded conversation channel 305 (in example, the conversation stream 310) using a new threaded conversation dialogue box 335. For example, the user may enter text into the new threaded conversation dialogue box 335 and select with the input mechanism 270 of the computing device 110 a post button 340 included in the new threaded conversation dialogue box 335 (for example, by clicking the post button 340 with a mouse-driven cursor). When the user selects the post button 340, the text entered in the new threaded conversation dialogue box 335 is posted to the threaded conversation channel 305 (in example, the conversation stream 310) as a new threaded conversation.

In some embodiments, the threaded conversation channel 305 includes additional, fewer, or different components than those illustrated in FIG. 4. Also, the threaded conversation channel 305 illustrated in FIG. 4 is one example of a threaded conversation channel, and embodiments described herein may be used with other types of threaded conversation channels and are not limited to the example threaded conversation channel illustrated in FIG. 4.

Figure 5:
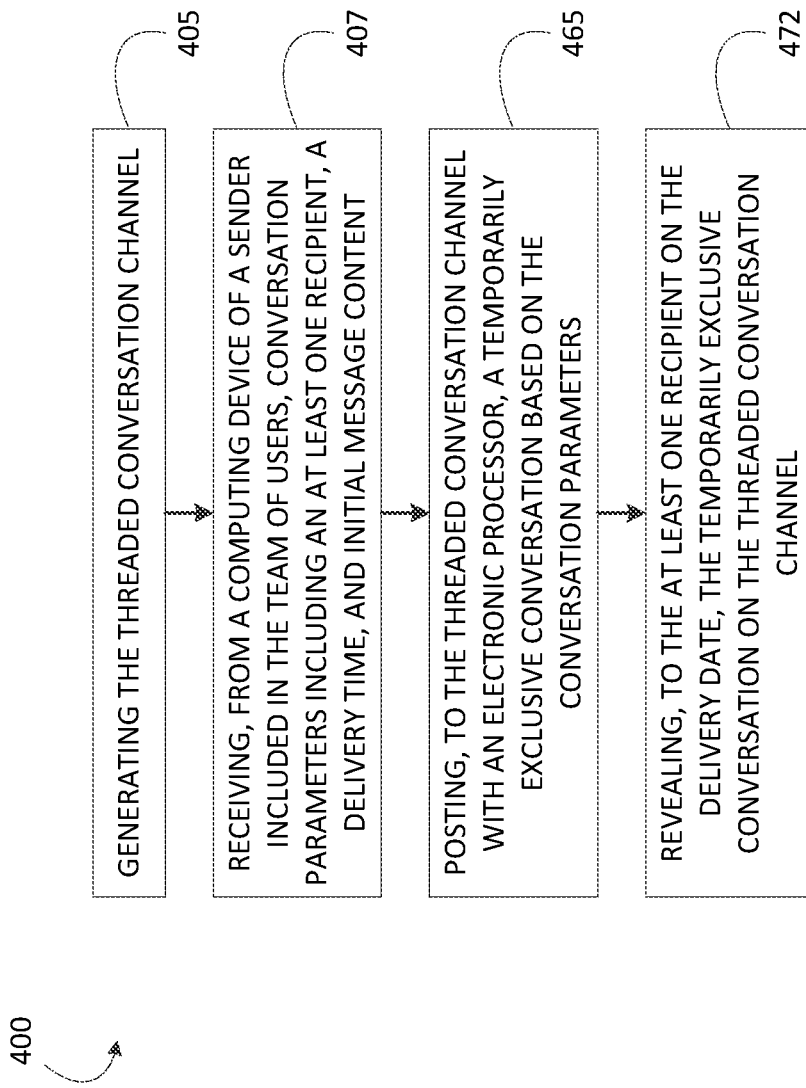
FIG. 5 is a flowchart illustrating a method of conversing in a threaded conversation using the system of FIG. 1.

FIG. 5 illustrates a method 400 of conversing in a threaded conversation channel performed by the system 100 according to one embodiment. As illustrated in FIG. 5, the method 400 includes generating the threaded conversation channel 305 for display (at block 405). For example, the server 105 generates the threaded conversation channel 305 by making available, to the team of users for the channel, channel data including one or more of user identities for a team of users, a threaded conversation channel name, and a conversation stream associated with the channel. The channel data may have been previously received from one of the computing devices 110 and stored in the server memory 205 during a channel setup. As part of generating the threaded conversation channel 305, the server 105 may further communicate the channel data to the computing device 110 for display. For example, the threaded conversation channel 305 may be communicated in response to a request from the computing device 110 (for example, upon a log-in by a user, update request from a user, or selection of the threaded conversation channel 305 using the channel navigation panel 308 via the computing device 110), or may be pushed to the computing device 110. In response, the threaded conversation channel 305, as illustrated in FIG. 4, is displayed to a user of the computing device 110 via the output mechanism 275 (for example, a display device, such as a computer monitor or screen). As noted above, the threaded conversation channel 305 is associated with a team of users. Accordingly, the threaded conversation channel 305 may be communicated to multiple users included within the team of users associated with the threaded conversation channel 305 for display via respective computing devices 110.

The method 400 also includes receiving, from a computing device 110 of a sender included in the team of users, conversation parameters (at block 407). The conversation parameters may include a recipient, a delivery time, initial message content, and a designation of a temporarily exclusive conversation. The recipient is a user included in the team of users for which the new threaded conversation (for example, the temporarily exclusive threaded conversation) is intended. The deliver time may be a date, a time of day, or a combination thereof that indicates when the temporarily exclusive conversation will be delivered to the recipient. The initial message content may include, for example, a conversation front, a conversation subject, a conversation message, or a combination thereof.

Figure 6:
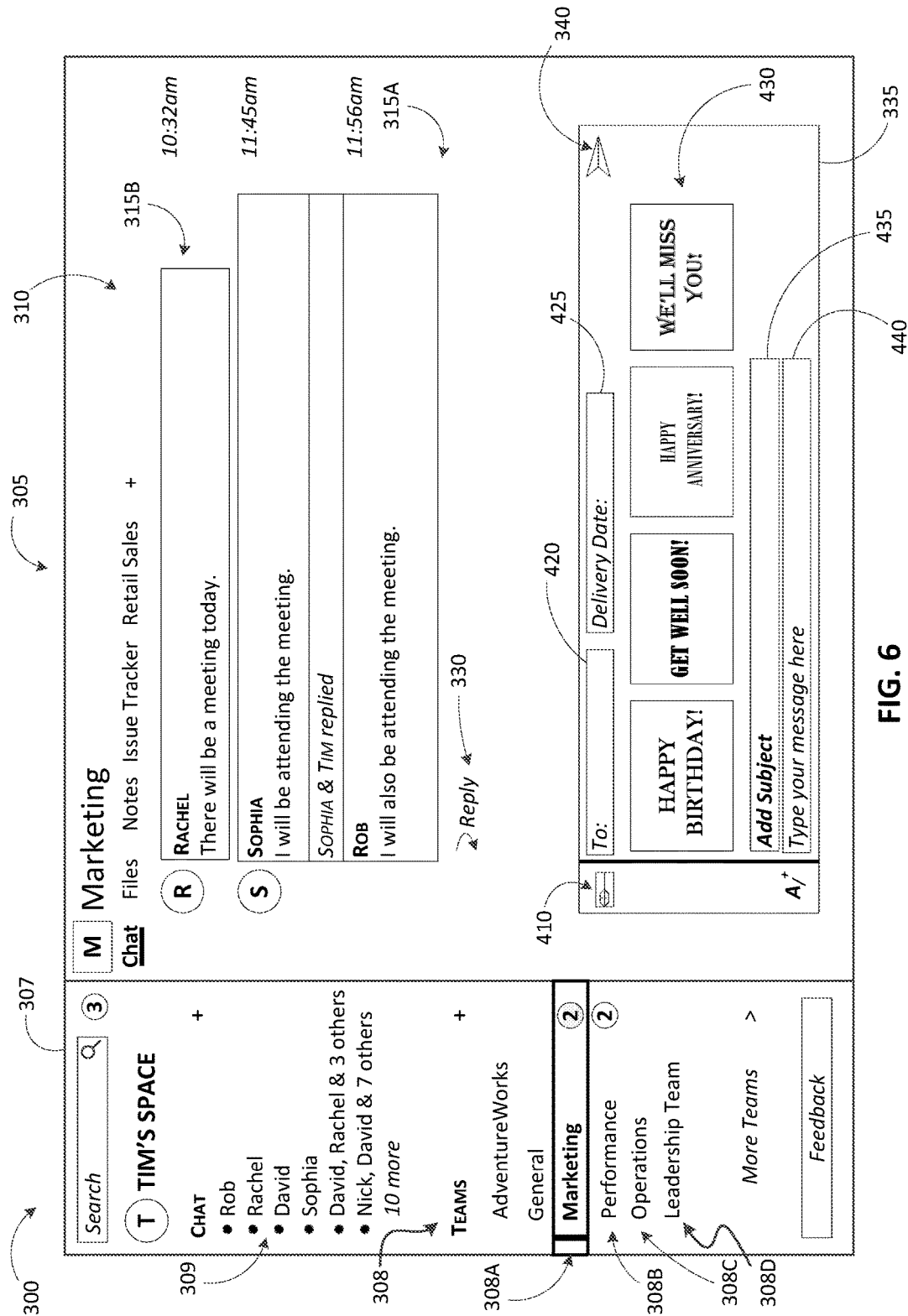
FIG. 6 is a screenshot that illustrates displaying a new threaded conversation dialogue box on the threaded conversation channel of FIG. 4.

For example, with reference to FIG. 6, the new threaded conversation dialogue box 335 is provided in the threaded conversation channel 305 in response to receiving a selection of the post button 340 based on user interaction via the computing device 110. The new threaded conversation dialog box 335 has additional threaded conversation options including an option to designate the new threaded conversation as a temporarily exclusive conversation via selection of a temporarily exclusive threaded conversation icon 410. When the new threaded conversation is designated as a temporarily exclusive threaded conversation, the new threaded conversation dialogue box 335 includes a plurality of input fields. In some embodiments, as illustrated in FIG. 6, the plurality of input fields includes, among others, a recipient input field 420, a delivery time input field 425, a conversation front input field 430, a conversation subject input field 435, and a conversation message input field 440. The computing device 110 may receive user input in the plurality of input fields to generate associated conversation parameters for sending to, and receipt by, the server 105.

Figure 7:
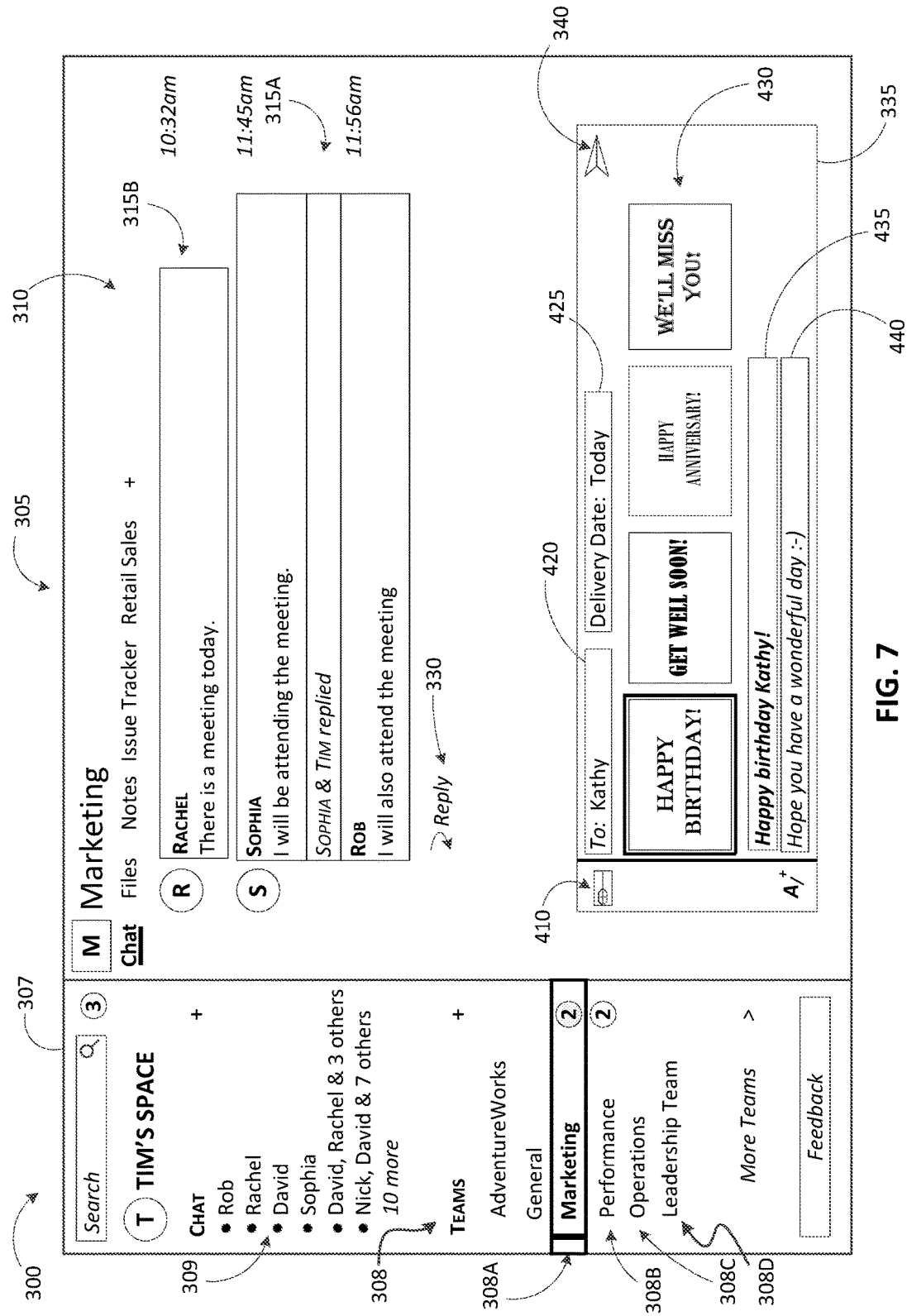
FIG. 7 is a screenshot that illustrates receiving conversation parameters with the new threaded conversation dialogue box of FIG. 6.

For example, as illustrated in FIG. 7, the sender may input "Kathy" (in example, the recipient) into the recipient input field 420, "today" (in example, the delivery time) into the delivery time input field 425, "Happy birthday Kathy!" (in example, the conversation subject) into the conversation subject input field 435, and "Hope you have a wonderful day:—)" (in example, the conversation message) into the conversation message input field 440. In addition, as seen in FIG. 7, the user may input a happy birthday conversation front (for example, a greeting card front) into the conversation front input field 430. In some embodiments, when selecting a conversation front, the user may scroll through a plurality of available conversation fronts and select the conversation front that the user desires, which may be with respect to, for example, a birthday card, an anniversary card, another greeting card, or another message type (for example, a company announcement or a team announcement).

After the computing device 110 of the sender receives the desired conversation parameters input by the sender, the inputted conversation parameters may be transmitted through the network interface 260 of the computing device 110 over the network 115 to the server 105. The server 105 (in example, the server electronic processor 200) may receive the conversation parameters through the server network interface 210.

Figure 8:
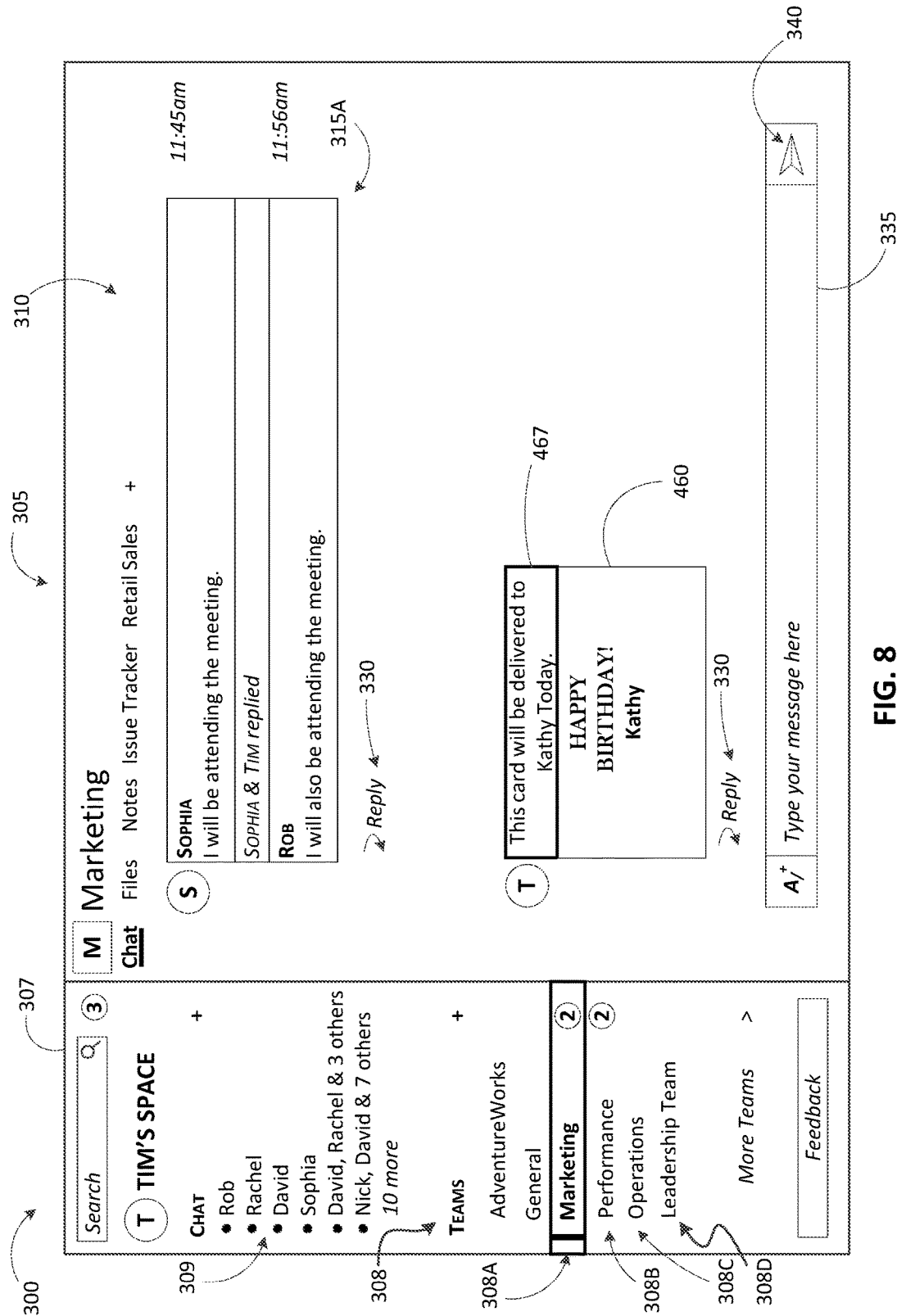
FIG. 8 is a screenshot that illustrates posting a temporarily exclusive conversation to the threaded conversation channel of FIG. 4.

Based on the received conversation parameters, the server 105, with the server electronic processor 200, posts a temporarily exclusive conversation to the threaded conversation channel 305 based on the conversation parameters (at block 465). The temporarily exclusive conversation, when posted, is hidden from the recipient on the threaded conversation channel 305 and viewable by the other users of the team of users. For example, FIG. 8 illustrates the threaded conversation channel 305 including a temporarily exclusive conversation 460 posted thereto. The temporarily exclusive conversation 460 is hidden from the recipient such that, when the recipient views the threaded conversation channel 305, the temporarily exclusive conversation 460 is not displayed in the conversation stream 310. However, as illustrated in FIG. 8, the temporarily exclusive conversation 460 is displayed in the conversation stream 310 to the users included in the team of users associated with the threaded conversation channel 305 who are not the recipient. As also illustrated in FIG. 8, the temporarily exclusive conversation 460 may be posted to the conversation stream 310 with the conversation front selected by the sender.

In some embodiments, to post, the server electronic processor 200 uses the received conversation parameters to generate, store in the server memory 205, and make available to one or more computing devices 110 the temporarily exclusive conversation 460. For example, the server 105 makes the temporarily exclusive conversation 460 available to the computing devices 110 of the team of users associated with the threaded conversation channel 305 other than the recipient. When made available, the temporarily exclusive conversation 460 may be communicated in response to a request from the computing device 110 (e.g., upon a next log-in by a user, update request from a user, or selection of the threaded conversation channel 305 using the channel navigation panel 308 via the computing device 110) or may be pushed to the computing device 110. Accordingly, as the temporarily exclusive conversation 460 is not made available to the computing device 110 of the recipient, the temporarily exclusive conversation 460 is not revealed to the recipient. For example, when the recipient accesses the threaded conversation channel 305 via the computing device 110 of the recipient, the temporarily exclusive conversation 460 is not provided to the computing device 110 and is, therefore, not displayed in the communication stream 310 for viewing by the recipient. Alternatively, the server 105 may provide the temporarily exclusive conversation 460 to the computing device 110 of the recipient, but the temporarily exclusive conversation 460 is made unavailable to the recipient by an included indication that indicates to the computing device 110 of the recipient to not reveal the temporarily exclusive conversation 460 to the recipient.

In some embodiments, the temporarily exclusive conversation 460 is posted to the threaded conversation channel 305 with a temporary banner 467. As illustrated in FIG. 8, the temporary banner 467 may be positioned across the top of the conversation front selected by the sender. The temporary banner 467 may provide a portion of the conversation parameters provided by the sender. For example, as illustrated in FIG. 8, the temporary banner 467 indicates the recipient and the delivery time of the temporarily exclusive conversation 460. Alternatively, or in addition, the temporary banner 467 may include temporary information, temporary indicators, or a combination thereof.

In some embodiments, posting the temporarily exclusive conversation 460 also includes generating a notification provided to each of the users included in the team of users other than the recipient. The notification may alert the other users to the posting of the temporarily exclusive conversation 460. In some embodiments, the notification includes an invitation to post reply messages to the temporarily exclusive conversation 460 for the recipient. The notification may include, for example, a visual notification (for example, a pop-up dialog box), an audio notification (for example, an audio sound), or a combination thereof generated by the respective computing devices 110. In some embodiments, each of the users included in the team of users interacts with the notification to navigate to the temporarily exclusive conversation 460 posted on the threaded conversation channel 305. For example, a user included in the team of users may click on the notification via the input mechanism 270 of the computing device 110 associated with the user. In some embodiments, when a user interacts with the notification, the user is automatically navigated to the temporarily exclusive conversation 460 posted on the threaded conversation channel 305.

Figure 9:
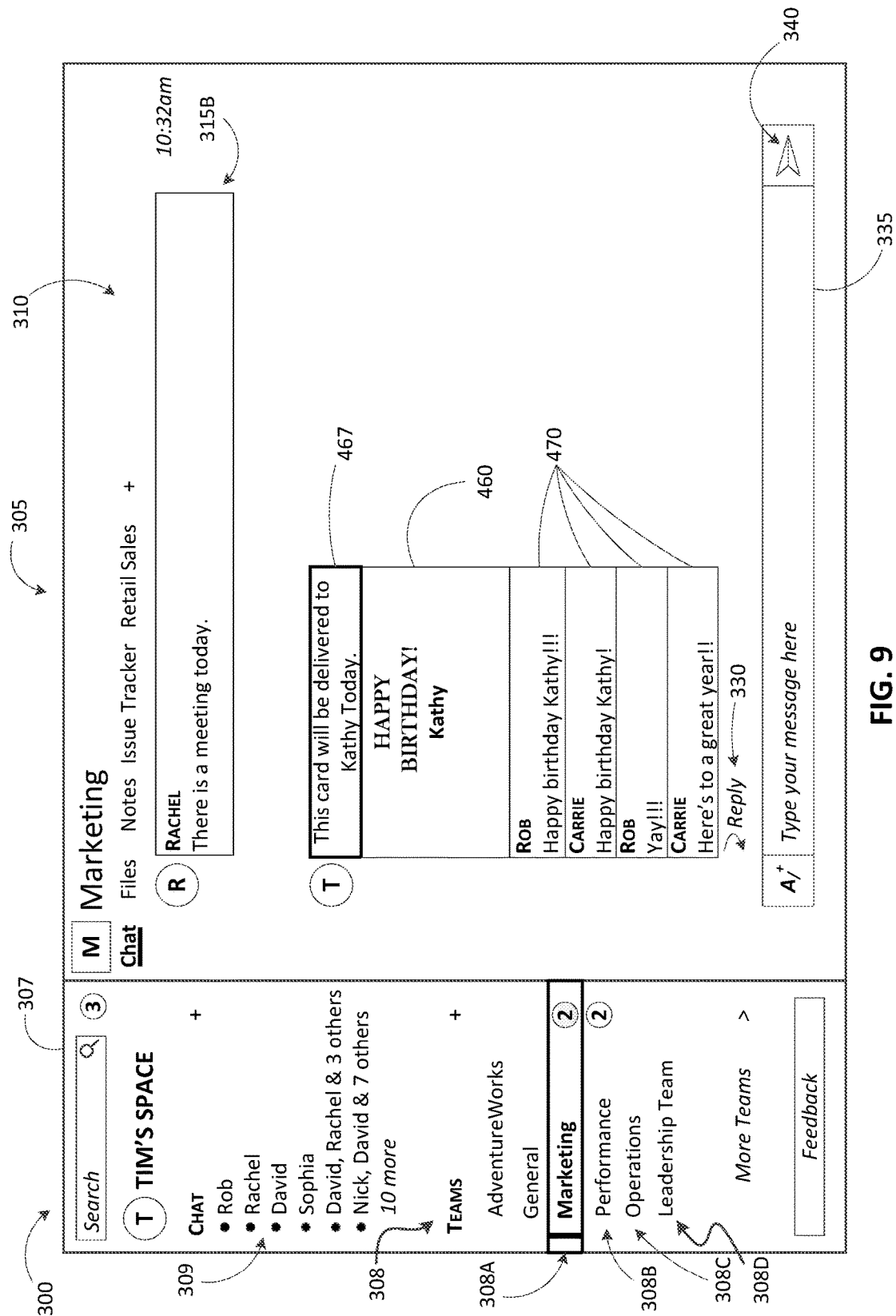
FIG. 9 is a screenshot that illustrates receiving a reply message to the temporarily exclusive conversation of FIG. 8.

In some embodiments, the server 105 (in example, the server electronic processor 200) receives one or more reply messages from the computing devices 110 of the users, other than the recipient, included in the team of users associated with the threaded conversation channel 305. For example, the computing devices 110 of the other users included in the threaded conversation channel 305 may receive a reply to the temporarily exclusive conversation 460 via user interaction with the reply button 330 associated with the temporarily exclusive conversation 460. The received replies are posted by the server 105. As illustrated in FIG. 9, the temporarily exclusive conversation 460 includes four rely messages 470 that are linked to the temporarily exclusive conversation 460. In some embodiments, the reply messages 470 are received while the temporarily exclusive conversation 460 is hidden from the recipient. Therefore, like the temporarily exclusive conversation 460, the reply messages 470, when posted, are hidden from the recipient. However, the reply messages 470, when posted, may be displayed to the other users included in the team of users associated with the threaded conversation channel 305.

Figure 10:
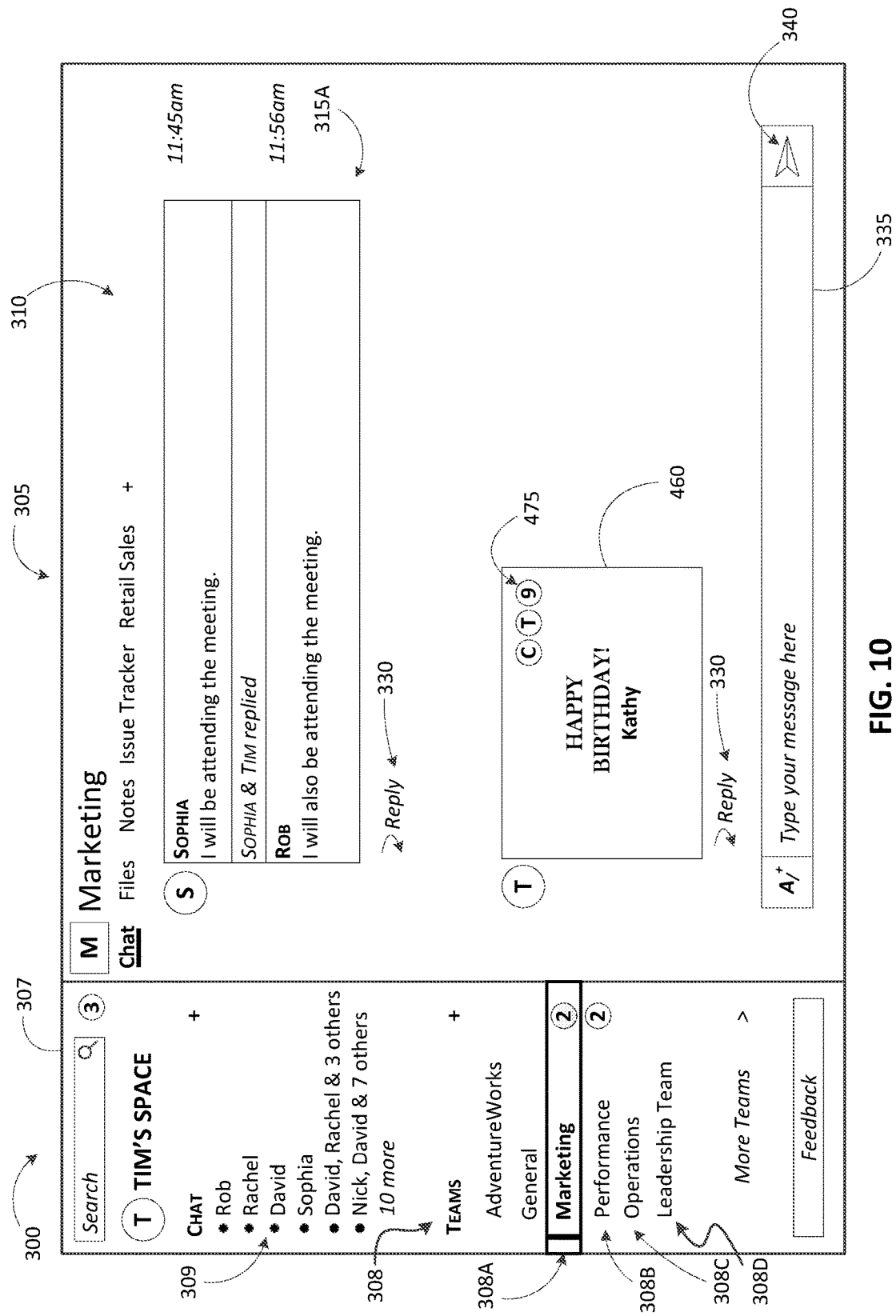
FIG. 10 is a screenshot that illustrates revealing the temporarily exclusive conversation on the threaded conversation channel of FIG. 4 from the point of view of a recipient of the temporarily exclusive conversation.

At the delivery time, the server 105 (in example, the server electronic processor 200) reveals the temporarily exclusive conversation 460 to the recipient on the threaded conversation channel 305 (at block 472). For example, to reveal, the server 105 makes the temporarily exclusive conversation 460 available to the recipient on the threaded conversation channel 305. When made available, the temporarily exclusive conversation 460 may be communicated in response to a request from the computing device 110 of the recipient (e.g., upon a next log-in by a user, update request from a user, or selection of the threaded conversation channel 305 using the channel navigation panel 308 via the computing device 110) or may be pushed to the computing device 110 of the recipient. FIG. 10 illustrates the temporarily exclusive conversation 460 revealed on the threaded conversation channel 305 from the point of view of the recipient of the temporarily exclusive conversation 460 (for example, on the computing device 110 of the recipient). For example, as illustrated in FIG. 10, when the temporarily exclusive conversation 460 is revealed on the threaded conversation channel 305, the conversation front selected by the sender is displayed to the recipient of the temporarily exclusive conversation 460 in the conversation stream 310. In some embodiments, the displayed conversation front includes an indicator 475 relating to the reply messages 470 associated with the temporarily exclusive conversation 460. For example, the indicator 475 may include a visual listing (for example, profile images) of the users who provided a reply message 470, a numerical indication of the total count of reply messages 470 associated with the temporarily exclusive conversation 460, and the like.

In some embodiments, revealing the temporarily exclusive conversation 460 also includes generating a notification provided to the recipient of the temporarily exclusive conversation 460. The notification may alert the recipient to the revealed temporarily exclusive conversation 460, which may also be referred to as the previously exclusive conversation. The notification may include, for example, a visual notification (for example, a pop-up dialog box), an audio notification (for example, an audio sound), or a combination thereof generated by the computing device 110 of the recipient. In some embodiments, the recipient interacts with the notification to navigate to the temporarily exclusive conversation 460 revealed on the threaded conversation channel 305. For example, the recipient may click on the notification via the input mechanism 270 of the computing device 110 associated with the recipient.

Figure 11:
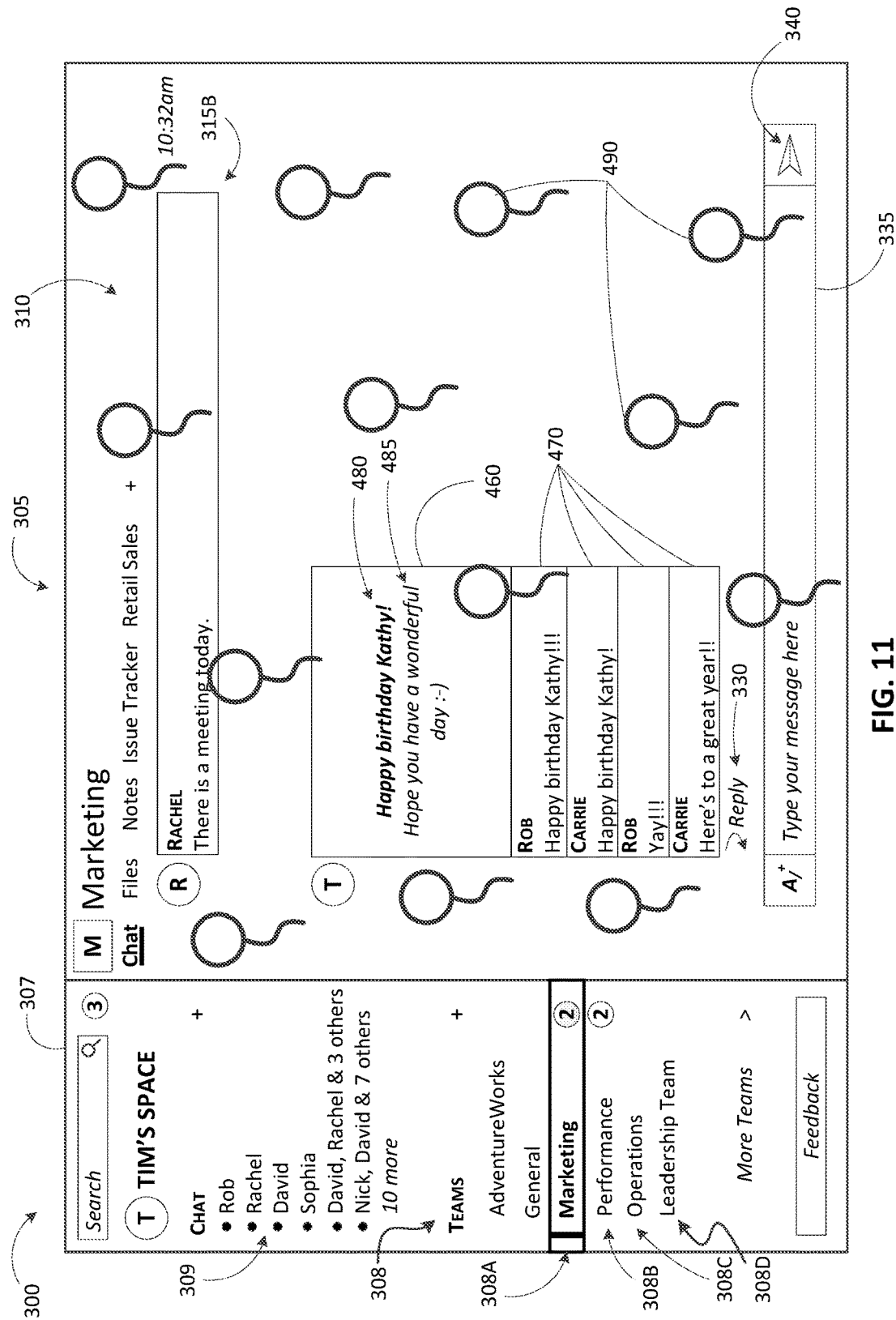
FIG. 11 is a screenshot that illustrates opening the temporarily exclusive conversation of FIG. 10 from the point of view of the recipient of the temporarily exclusive conversation.

After the temporarily exclusive conversation 460 is revealed to the recipient, the recipient may interact with the temporarily exclusive conversation 460. For example, the recipient may open the temporarily exclusive conversation 460 by interacting with the temporarily exclusive conversation 460 via the one or more input mechanisms 270 of the computing device 110 (for example, by clicking on the temporarily exclusive conversation 460 with a mouse-driven cursor or touch screen). In response to the interaction, the temporarily exclusive conversation 460 is opened, as illustrated in FIG. 11. When the temporarily exclusive conversation 460 is opened, the additional message content, such as a conversation subject 480 and a conversation message 485, is displayed to the recipient. In some embodiments, the temporarily exclusive conversation 460 may be opened without interaction from the recipient. For example, the temporarily exclusive conversation 460 may be opened when the recipient accesses the threaded conversation channel 305 for viewing on the computing device 110. In addition, the reply messages 470, if any, received from the other users included in the team of users may be accessed and displayed by the recipient. In some embodiments, the replies and other interactions may be present in a collapsed view and may be expanded and viewed by the recipient.

In some embodiments, the recipient's interaction with the temporarily exclusive conversation 460 triggers a special effect. The special effect may be displayed over the threaded conversation channel 305 displayed on the computing device 110 associated with the recipient of the temporarily exclusive conversation 460. In some embodiments, the special effect is also displayed to the other users included in the team of users via the computing devices 110 associated with each of the other users. The special effect may include, for example, a video, an animation, an image, text, a symbol(s), a sound(s), and the like. For example, as illustrated in FIG. 10, the special effect may include a plurality of balloon images 490 floating across the threaded conversation channel 305 displayed on the computing device associated with the recipient of the temporarily exclusive conversation 460.

In some embodiments, reply messages may be received by the server 105 (in example, the server electronic processor 200) after the temporarily exclusive conversation 460 is revealed to the recipient on the threaded conversation channel 305. Reply messages 470 that are received after the temporarily exclusive conversation 460 may be instantaneously displayed in the threaded conversation channel 305 and linked to the temporarily exclusive conversation 460. In other words, after the temporarily exclusive conversation 460 is revealed to the recipient, the computing devices 110 of the users included in the team of users associated with the threaded conversation channel 305, including the computing device 110 of the recipient, may receive replies to the temporarily exclusive conversation 460.

In some embodiments, the computing device 110 of the sender may receive conversation parameters from the sender that include more than one recipient. For example, with reference back to the method 400 of FIG. 5, block 407 may include receiving conversation parameters that include a first recipient and a second recipient (for example, the sender, via the input mechanism 270 of the computing device 110 of the sender, inputs a first recipient and a second recipient into the recipient input field 420 of the new threaded conversation dialogue box 335). With respect to block 465 of the method 400 of FIG. 5, when the computing device 110 of the sender receives conversation parameters that include more than one recipient (for example, a first recipient and a second recipient), the computing devices 110 of the sender may send instructions to the server 105 instructing the server 105 to hide the temporarily exclusive conversation 460 from the first recipient and the second recipient on the threaded conversation channel 305 when the server 105 posts the temporarily exclusive conversation 460 to the threaded conversation channel 305. Furthermore, when the server 105 reveals the temporarily exclusive conversation 460 at the delivery time, the temporarily exclusive conversation 460 is made available to both the first recipient and the second recipient.

Thus, embodiments provide, among other things, temporarily exclusive conversations on a threaded conversation channel. However, the temporarily exclusive conversations described herein may be used on other conversation channels. For example, in some embodiments, the temporarily exclusive conversations described herein may be used on non-threaded conversation channels.

Various features and advantages of the embodiments are set forth in the following claims.

What is claimed is:

1. A data processing system implementing a threaded conversation channel, the data processing system comprising:
    a network interface coupled to a network;
    a memory for storing instructions; and
    an electronic processor coupled to the network interface and the memory, the electronic processor configured to execute the instructions stored in the memory to
        generate the threaded conversation channel, the threaded conversation channel associated with a plurality of users,
        receive conversation parameters including an at least one recipient, a delivery time, and initial message content,
        post, to the threaded conversation channel, a temporarily exclusive conversation based on the conversation parameters, wherein the temporarily exclusive conversation is hidden from at least a first user of the plurality of users and viewable by at least a second user of the plurality of users on the threaded conversation channel, the conversation parameters indicating to hide the temporarily exclusive conversation from the first user or make viewable the temporarily exclusive conversation to the second user, and reveal, to the first user at the delivery time, the temporarily exclusive conversation on the threaded conversation channel.

2. The data processing system of claim 1, wherein the electronic processor is further configured to execute the instructions stored in the memory to receive, while the temporarily exclusive conversation is hidden from the first user, a reply message from a computing device of the second user or another user included in the plurality of users, wherein the reply message is associated with the temporarily exclusive conversation.

3. The data processing system of claim 2, wherein the electronic processor is further configured to execute the instructions stored in the memory to post, to the threaded conversation channel, while the temporarily exclusive conversation is hidden from the first user, the reply message, wherein the reply message is hidden from the first user on the threaded conversation channel and viewable by at least one selected from the group of the second user or another user included in the plurality of users.

4. The data processing system of claim 1, wherein the at least one recipient includes the first user and a second recipient,
wherein the temporarily exclusive conversation is hidden from the first user and the second recipient on the threaded conversation channel when the temporarily exclusive conversation is posted to the threaded conversation channel, and
wherein the temporarily exclusive conversation is revealed to the first user and the second recipient at the delivery time.

5. The data processing system of claim 1, wherein the initial message content includes at least one selected from the group consisting of a temporarily exclusive conversation subject, a temporarily exclusive conversation message, and a temporarily exclusive conversation front.

6. The data processing system of claim 1, wherein, when the temporarily exclusive conversation is posted to the threaded conversation channel, the electronic processor is further configured to execute the instructions stored in the memory to
post the temporarily exclusive conversation with a temporary banner indicating the delivery time, and
generate a notification to each user included in the plurality of users other than the first user, the notification inviting each user included in the plurality of users to reply to the temporarily exclusive conversation.

7. The data processing system of claim 1, wherein the electronic processor is further configured to execute the instructions stored in the memory to
detect an interaction between the temporarily exclusive conversation and the first user on a computing device of the first user,
expand, in response to the interaction, the temporarily exclusive conversation, wherein the expanded temporarily exclusive conversation includes at least one selected from the group consisting of at least one reply from another user included in the plurality of users and the initial message content, and display, in response to the interaction, a special effect to the first user.

8. The data processing system of claim 1, wherein the threaded conversation channel includes a first threaded conversation and a second threaded conversation, wherein the second threaded conversation includes the temporarily exclusive conversation.

9. A method of conversing on a threaded conversation channel, the method comprising:
generating the threaded conversation channel, the threaded conversation channel being associated with a plurality of users;
receiving conversation parameters including an at least one recipient, a delivery time, and initial message content;
posting, to the threaded conversation channel with an electronic processor, a temporarily exclusive conversation based on the conversation parameters, wherein the temporarily exclusive conversation is hidden from at least a first user of the plurality of users and viewable by at least a second user of the plurality of users on the threaded conversation channel, the conversation parameters indicating to hide the temporarily exclusive conversation from the first user or make viewable the temporarily exclusive conversation to the second user; and
revealing, to the first user at the delivery time, the temporarily exclusive conversation on the threaded conversation channel.

10. The method of claim 9, further comprising:
receiving, while the temporarily exclusive conversation is hidden from the first user, a reply message from a computing device of the second user or another user included in the plurality of users.

11. The method of claim 10, further comprising:
posting, to the threaded conversation channel, while the temporarily exclusive conversation is hidden from the first user, the reply message, wherein the reply message is hidden from the first user on the threaded conversation channel and viewable by at least one selected from the group of the second user or another user included in the plurality of users.

12. The method of claim 9, wherein the at least one recipient includes the first user and a second recipient,
wherein the temporarily exclusive conversation is hidden from the first user and the second recipient on the threaded conversation channel when the temporarily exclusive conversation is posted to the threaded conversation channel, and
wherein the temporarily exclusive conversation is revealed to the first user and the second recipient at the delivery time.

13. The method of claim 9, further comprising:
receiving, after the temporarily exclusive conversation is revealed to the first user, a reply message from a computing device of the second user or another user included in the plurality of users, wherein the reply message is associated with the temporarily exclusive conversation.

14. The method of claim 9, wherein posting the temporarily exclusive conversation to the threaded conversation channel includes posting the temporarily exclusive conversation with a temporary banner indicating the delivery time and generating a notification to each user included in the plurality of users other than the first user, the notification inviting each user included in the plurality of users to reply to the temporarily exclusive conversation.

15. The method of claim 9, wherein revealing the temporarily exclusive conversation to the first user includes generating a notification to the first user that the temporarily exclusive conversation was revealed.

16. The method of claim 9, further comprising:
   detecting an interaction between the temporarily exclusive conversation and the first user on a computing device of the first user;
   expanding, in response to the interaction, the temporarily exclusive conversation, wherein the expanded temporarily exclusive conversation includes at least one selected from the group consisting of at least one reply from another user included in the plurality of users and the initial message content; and
   displaying, in response to the interaction, a special effect to the first user.

17. A non-transitory computer readable medium including instructions that, when executed by an electronic processor, cause the electronic processor to execute a set of functions, the set of functions comprising:
   generating the threaded conversation channel, the threaded conversation channel being associated with a plurality of users;
   receiving conversation parameters including an at least one recipient, a delivery time, and initial message content;
   posting, to the threaded conversation channel with an electronic processor, a temporarily exclusive conversation based on the conversation parameters, wherein the temporarily exclusive conversation is hidden from the at least a first user of the plurality of users and viewable by at least a second user of the plurality of users on the threaded conversation channel, the conversation parameters indicating to hide the temporarily exclusive conversation from the first user or make viewable the temporarily exclusive conversation to the second user; and
   revealing, to the first user at the delivery time, the temporarily exclusive conversation on the threaded conversation channel.

18. The non-transitory computer readable medium of claim 17, wherein the set of functions further comprises:
   receiving, while the temporarily exclusive conversation is hidden from the first user, a reply message from a computing device of the second user ot another user included in the plurality of users, wherein the reply message is associated with the temporarily exclusive conversation.

19. The non-transitory computer readable medium of claim 18, wherein the set of functions further comprises:
   posting, to the threaded conversation channel, while the temporarily exclusive conversation is hidden from the first user, the reply message, wherein the reply message is hidden from the first user on the threaded conversation channel and viewable by at least one selected from the group of the second user or another user included in the plurality of users.

20. The non-transitory computer readable medium of claim 17, wherein the at least one recipient includes the first user and a second recipient,
   wherein the temporarily exclusive conversation is hidden from the first user and the second recipient on the threaded conversation channel when the temporarily exclusive conversation is posted to the threaded conversation channel, and
   wherein the temporarily exclusive conversation is revealed to the first user and the second recipient at the delivery time.

* * * * *